(12) United States Patent
Lee

(10) Patent No.: US 6,885,407 B1
(45) Date of Patent: Apr. 26, 2005

(54) APPARATUS FOR DISPLAYING GUIDE LINE FOR PICTURE ADJUSTMENT IN MONITOR

(75) Inventor: Jun Hyeong Lee, Daegu Metropolitan (KR)

(73) Assignee: LG Electronics Inc., Seoul (KR)

(*) Notice: Subject to any disclaimer, the term of this patent is extended or adjusted under 35 U.S.C. 154(b) by 525 days.

(21) Appl. No.: 09/678,838

(22) Filed: Oct. 4, 2000

(30) Foreign Application Priority Data

Oct. 4, 1999 (KR) ........................................ 1999-42545

(51) Int. Cl.[7] ............................................. H04N 5/50
(52) U.S. Cl. ....................................... 348/569; 348/589
(58) Field of Search ................................ 348/569, 570, 348/589; 345/634, 636, 629

(56) References Cited

U.S. PATENT DOCUMENTS

| | | | |
|---|---|---|---|
| 4,827,251 A | * 5/1989 | Aoki et al. | 345/636 |
| 5,963,266 A | * 10/1999 | Fujimori | 348/511 |
| 6,008,860 A | * 12/1999 | Patton et al. | 348/565 |
| 6,084,564 A | * 7/2000 | Ohara et al. | 345/20 |
| 6,130,659 A | * 10/2000 | Kim et al. | 345/581 |
| 6,195,087 B1 | * 2/2001 | Wu | 345/213 |
| 6,307,596 B1 | * 10/2001 | Cho | 348/563 |

FOREIGN PATENT DOCUMENTS

JP 402146875 A * 6/1990 ......... H04N/5/268

* cited by examiner

*Primary Examiner*—Michael H. Lee
(74) *Attorney, Agent, or Firm*—Fleshner & Kim, LLP

(57) ABSTRACT

Disclosed is an apparatus for displaying a guide line for picture adjustment in a monitor. The apparatus includes a control section for recognizing a command for executing a picture adjustment mode from a user, and outputting commands for generating an OSD and a guideline, respectively, a guideline information providing section for receiving the command for generating the guideline from the control section, and outputting information related to forming the guideline, an image signal generator for receiving information related to forming the guideline from the guideline information providing section, and outputting an image signal to construct a picture including the guideline corresponding to the information related to the guideline, an OSD generating section for receiving the command for generating the OSD from the control section, and outputting an OSD image signal to adjust a picture, an image amplifying section for combining the image signal including the guideline outputted from the image signal generator with the OSD image signal outputted from the OSD generating section, and a display section for displaying an output of the image amplifying section on a display screen.

53 Claims, 4 Drawing Sheets

APPARATUS FOR DISPLAYING GUIDE LINE FOR PICTURE ADJUSTMENT IN MONITOR

BACKGROUND OF THE INVENTION

1. Field of the Invention

The present invention relates to an apparatus for displaying guide line for picture adjustment in a monitor, and more particularly to an apparatus for displaying guide line for picture adjustment in a monitor, which displays a guideline around a periphery of the screen when adjusting the picture, thereby enabling a user to confirm the adjusted result.

2. Description of the Related Art

In general, if a user selects a picture adjustment mode, the on-screen display (OSD) device displays patterns, which are used for displaying specified items for adjusting the picture such as size, position, pin cushion, on the screen.

The user can confirm the varying state of an adjustment value set by himself/herself by means of a numerical value or a bar appearing within the OSD of the picture to display the state of adjustment.

Figure 1:
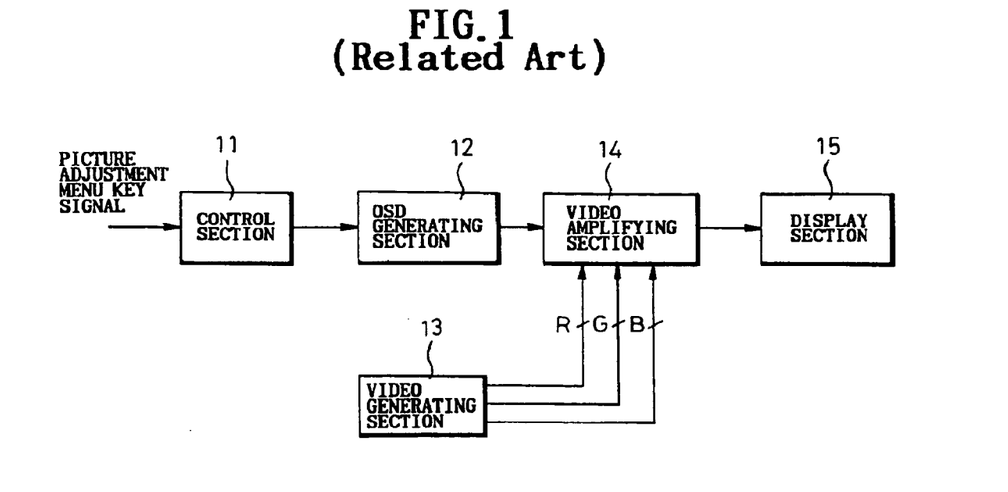
FIG. 1 is a block diagram showing a construction of the conventional device of displaying an OSD for a monitor.

FIG. 1 shows the conventional OSD device for a monitor comprising a control section 11, an OSD generating section 12, an image generator 13, an image amplifier 14 and a display section 15.

The control section 11 is mounted inside of a monitor and outputs a control signal so that the OSD for a picture adjustment mode can be displayed at a predetermined position of the picture in accordance with an input of a picture adjustment menu key by a user. Thus, the control section 11 exchanges data with a system in a main body of a PC. The OSD generating section 12 generates the corresponding OSD in accordance with a control signal from the control section 11. The image generator 13 is mounted on the main body of the PC, and outputs image signals R, G, B to construct a picture corresponding to the control signal from the system in the main body of the PC. The image amplifier 14 combines the OSD image outputted from the OSD generating section 12 with the image signals outputted from the image signal generator 13 to amplify the combined signals. The display section 15 displays an output of the image amplifier on the screen.

The operation of the conventional OSD displaying device for a monitor will now be explained in further detail.

If the user first inputs a picture adjustment menu key through a key input section of the monitor, the control section 11 of the monitor recognizes the input.

The control section 11 locates the position for displaying the OSD in accordance with the horizontal and vertical synchronous signals inputted from the system in the main body of the PC, and outputs a command for generating the OSD to the OSD generating section 12 so that the OSD for picture adjustment mode can be embodied at the corresponding position.

Subsequently, the OSD generating section 12 generates image signals to construct the corresponding OSD in accordance with the control signal outputted from the control section 11 to the image amplifying section 14.

Figure 2:
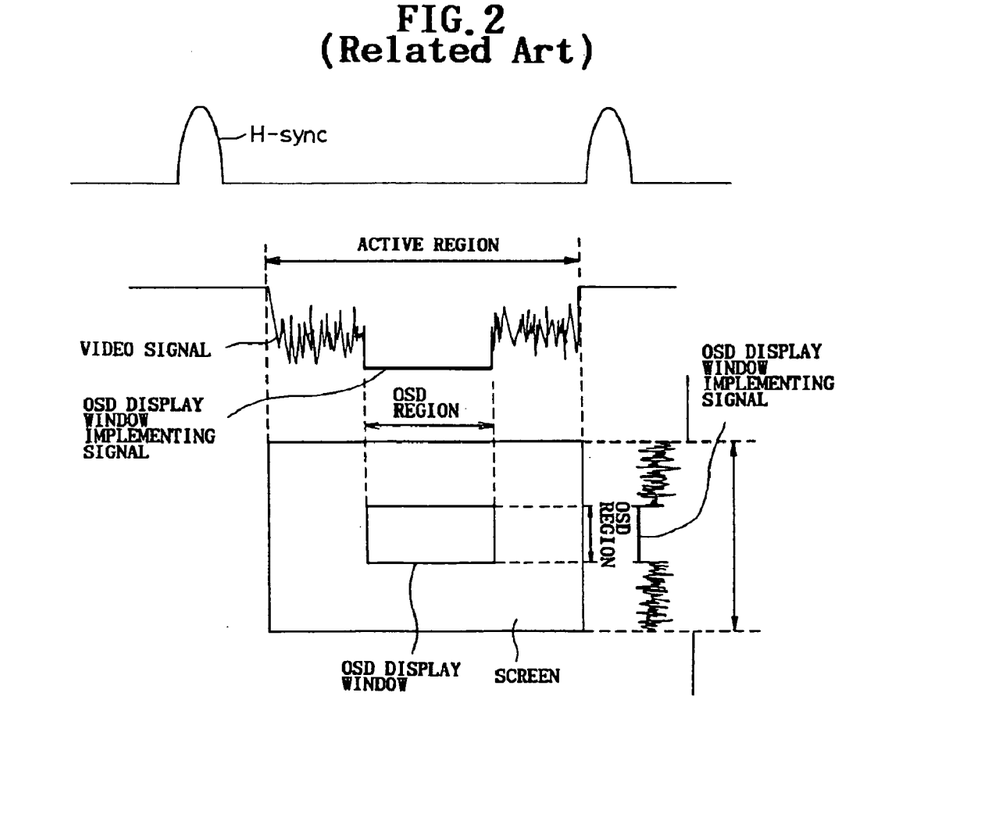
FIG. 2 is a diagram showing an image signal waveform for embodying an OSD display window in FIG. 1.

Meanwhile, the image signal generator 13 outputs the image signals R, G, B to the image amplifying section 14, as shown in FIG. 2.

The image amplifying section 14 then combines an output from the OSD generating section 12 with an output from the image signal generator 13, and amplifies the combined outputs to a predetermined level so as to output the amplified image signal to the display section 15.

Figure 3:
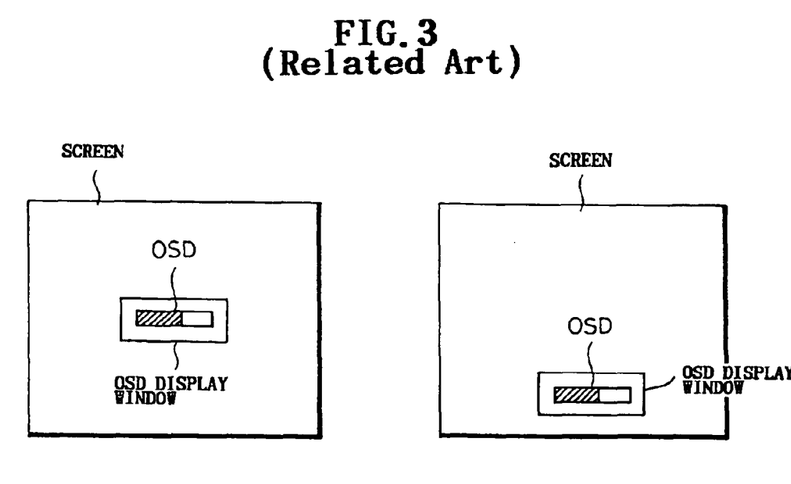
FIG. 3 is a block diagram showing an OSD display picture according to the conventional technology.

As shown in FIG. 3, the display section 15 displays the signals outputted from the image amplifying section 14 at a predetermined position of an OSD display window such as in the middle or at a lower portion of the screen undergoing a series of signal processing.

At this time, the user can confirm the picture adjustment result in the picture adjustment mode in accordance with the adjusted value by means of the numerical value or a bar displayed by OSD.

In the picture adjustment mode of a monitor according to the conventional technology, the user can confirm the actual picture adjustment result by using the OSD. However, the actual picture is not clearly distinguished from the entire region of the picture. Thus, the picture adjustment result cannot be easily viewed on the picture, thereby posing a problem of failing to perform a picture adjustment as desired by the user.

SUMMARY OF THE INVENTION

To solve at least the problems and disadvantages of the related ar an object of the present invention is to provide an apparatus for displaying a guide line for picture adjustment in a monitor, which enables a user to easily adjust the picture and view the result thereof.

Additional advantages, objects, and features of the invention will be set forth in part in the following description and will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein according to an aspect of the present invention, there is provided an apparatus for displaying a guide line for picture adjustment in a monitor, comprising a control section for recognizing a command for executing a picture adjustment mode from a user, and outputting commands for generating an OSD and a guideline, respectively; a guideline information providing section for receiving the command for generating the guideline from the control section, and outputting information related to forming the guideline; an image signal generator for receiving information related to forming the guideline from the guideline information providing section, and outputting an image signal to construct a picture including the guideline corresponding to the information related to the guideline; an OSD generator section for receiving the command for generating the OSD from the control section, and outputting an OSD image signal to adjust a picture; an image amplifying section for combining the image signal including the guideline outputted from the image signal generator with the OSD image signal outputted from the OSD generating section; and a display section for displaying an output of the image amplifying section on a display screen.

Here, the information related to forming the guideline preferably includes at least one kind of information between thickness and color of the guideline.

According to another aspect of the present invention, there is provided an apparatus for displaying a guide line for picture adjustment in a monitor, comprising an image signal generator for outputting an image signal to construct a picture; a control section for recognizing a command for executing a picture adjustment mode from a user, identifying a command for generating an OSD for picture adjustment, and beginning and ending positions of an active region of the image signal, and outputting a guideline pattern signal for generating a guideline; an OSD generating section for receiving the command for generating the OSD from the control section, and outputting an OSD image signal; an image amplifying section for combining the image signal outputted from the image signal generator, the guideline pattern signal outputted from the control section, and the OSD image signal outputted from the OSD generating section, and amplifying the combined signal; and a display section for displaying an output of the image amplifying section on a display screen.

Here, the control section preferably includes an active region detector for detecting the beginning and ending positions of the active region of the image signals outputted from the image signal generator, and a guideline pattern generator for generating a guideline at the beginning and ending positions of the detected active region.

Also, the active region detector is preferably a high-speed detective IC used for auto-sizing.

According to still another aspect of the present invention, there is provided an apparatus for displaying a guide line for picture adjustment in a monitor, comprising an image signal generator for generating an image signal to construct a picture; a control section for recognizing a command for executing a picture adjustment mode from a user, and identifying a position of generating a guideline in accordance with inputted horizontal/vertical synchronous signals, and outputting a command for generating an OSD signal and the guideline signal for picture adjustment at the corresponding position; an OSD generating section for receiving the command for generating the OSD signal and the guideline signal from the control section, and outputting the OSD signal and the guideline signal; an image amplifying section for combining the OSD signal, the guideline signal outputted from the OSD generating section, and the image signal outputted from the image signal generator, and amplifying the combined signal; and a display section for displaying an output of the image amplifying section on a display screen.

BRIEF DESCRIPTION OF THE DRAWINGS

The invention will now be described in detail with reference to the accompanying drawings, in which.

DETAILED DESCRIPTION OF THE INVENTION

Preferred embodiments of the present invention will be described hereinafter with reference to the accompanying drawings.

Figure 4:
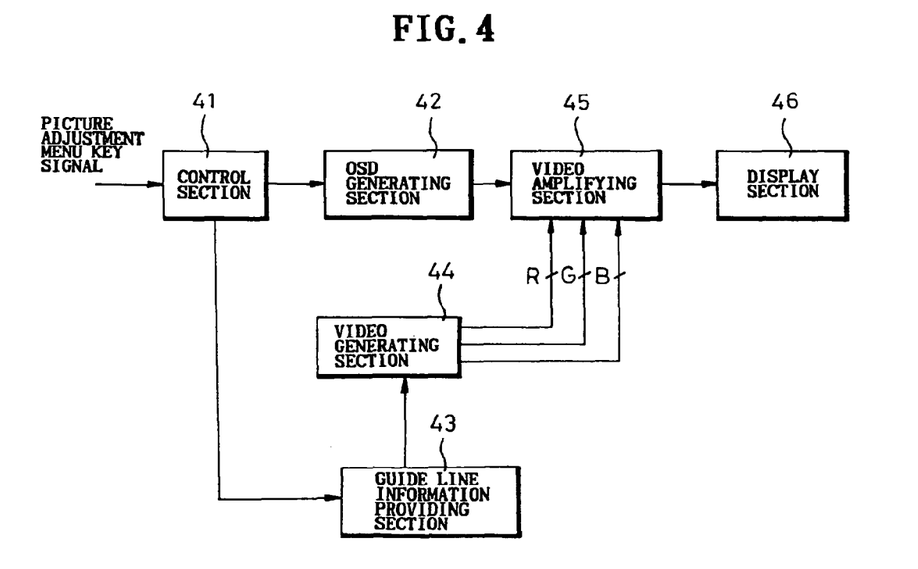
FIG. 4 is a block diagram showing a construction of a device of displaying a picture adjustment guideline for a monitor according to a first embodiment of the present invention.
Figure 5:
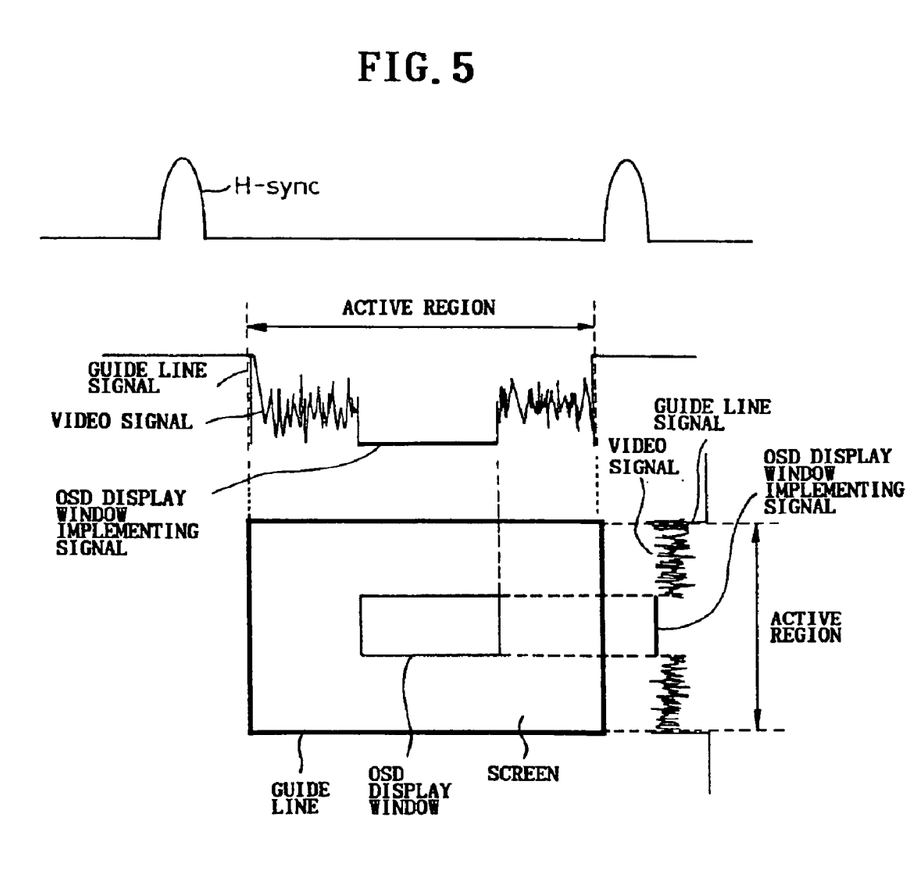
FIG. 5 is a diagram showing an image signal waveform for embodying a picture adjustment guideline in FIG. 4.
Figure 6:
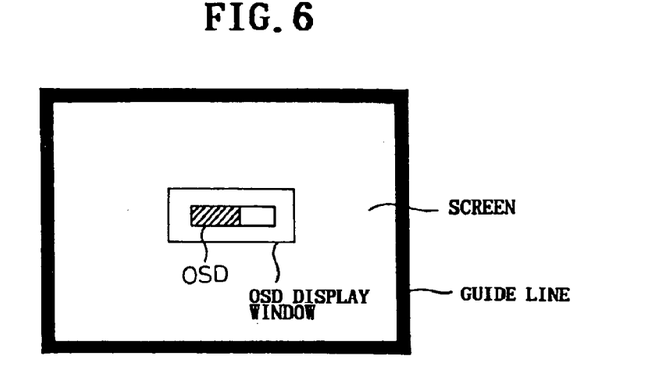
FIG. 6 is a block diagram showing a picture adjustment guideline according to the present invention.
Figure 7:
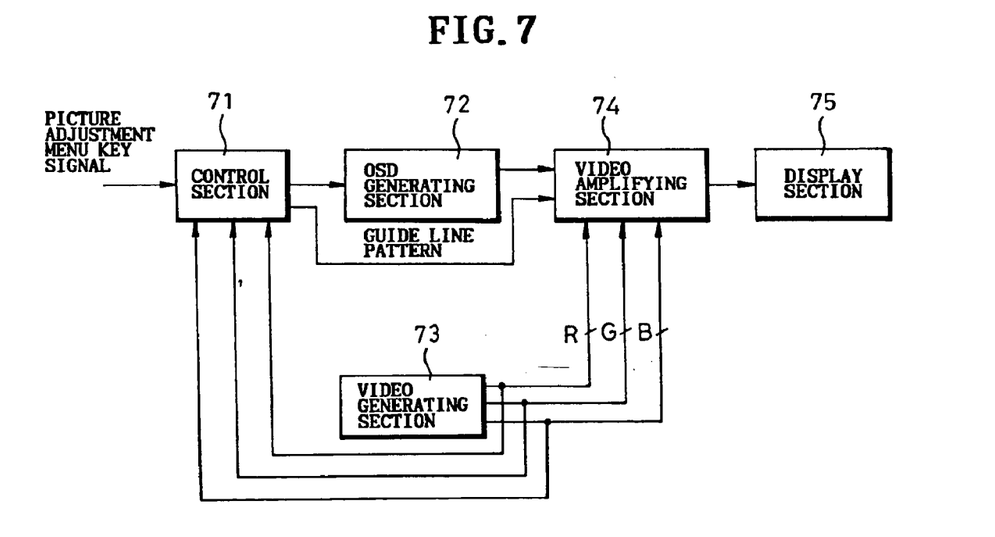
FIG. 7 is a block diagram showing a construction of a device of displaying a picture adjustment guideline for a monitor according to a second embodiment of the present invention.
Figure 8:
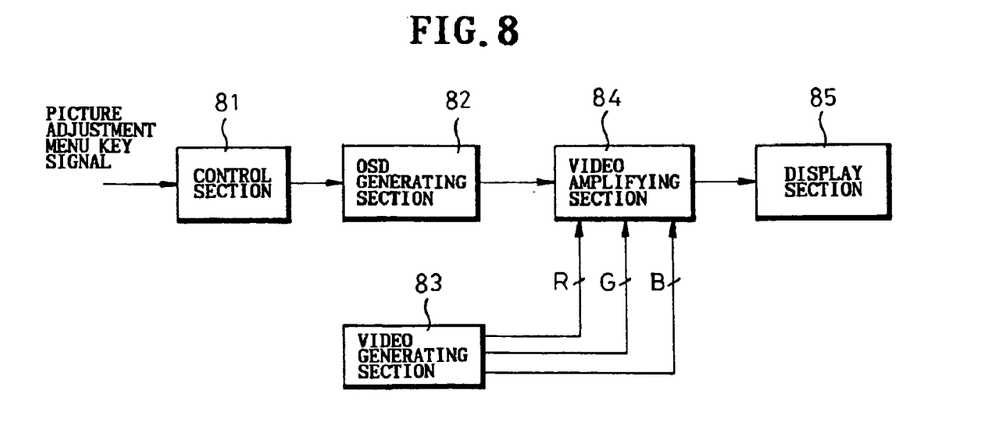
FIG. 8 is a block diagram showing a construction of a device of displaying a picture adjustment guideline for a monitor according to a third embodiment of the present invention.

FIG. 4 is a block diagram showing a construction of an apparatus for displaying a guide line for picture adjustment in a monitor according to a first embodiment of the present invention. FIG. 5 is a diagram showing an image signal waveform for embodying a picture adjustment guideline in FIG. 4. FIG. 6 is a block diagram showing a picture adjustment guideline according to the present invention. FIG. 7 is a block diagram showing a construction of an apparatus for displaying guide line for picture adjustment in a monitor according to a second embodiment of the present invention. FIG. 8 is a block diagram showing a construction of an apparatus for displaying guide line for picture adjustment in a monitor according to a third embodiment of the present invention.

Embodiment 1

As shown in FIG. 4, the first embodiment of an apparatus for displaying a guide line for picture adjustment in a monitor according to the present invention includes an OSD generating section 42 for generating predetermined OSD image signals in accordance with a control signal outputted from a control section 41 inside of the monitor, an image signal generator 44 for generating image signals R, G, B to construct a picture including a picture adjustment guideline, a guideline information providing section 43 for transferring information related to forming a corresponding guideline to the image signal generator 44 in accordance with a command for generating a guideline outputted from the control section 41, an image amplifying section 45 for combining an OSD image outputted from the OSD generating section 42 with the image signals including the guideline outputted from the image signal generator 44, and amplifying the combined signals, a display section 46 for displaying an output from the image amplifying section 45 on the picture, and a control section 41 for outputting a command for generating the OSD to the OSD generating section by recognizing a command for implementing a picture adjustment mode from a user, and transferring a command for generating a guideline to the guideline information providing section 43.

An operation of the apparatus for displaying a guide line for picture adjustment according to a first embodiment of the present invention constructed above will now be described in further detail.

The user first inputs a picture adjustment menu key through a key input section of the monitor. The control section 41 of the monitor subsequently recognizes the input.

The control section 41 locates a position to display an OSD in accordance with horizontal and vertical synchronous signals pre-inputted from a system in a main body of a PC. The control section 41 also transfers a command for generating an OSD to the OSD generating section 42 so that an OSD of the picture adjustment mode can be displayed at the corresponding position. At the same time, the control section 41 also transfers a command for generating a guideline to the guideline information providing section 43.

Subsequently, the OSD generating section 42 outputs image signals for constructing the corresponding OSD in accordance with the control signal transferred from the control section 41 to the image amplifying section 45. The guideline information providing section 43 recognizes the command for generating the guideline from the control section 41, and transfers the information related to the guideline such as thickness and color of the guideline to the image signal generator 44.

Accordingly, as shown in FIG. 5, the image signal generator 44 generates image signals, including a guideline signal, image signal and OSD display window embodiment signal in the active region, and outputs the same to the image amplifying section 45.

The image amplifying section 45 combines an output of the OSD generating section 42 with an output of the image signal generator 44, and amplifies the combined signals to a predetermined level so as to be outputted to the display section 46.

As shown in FIG. 6, the display section 46 undergoes a series of signal processing with an output of the image amplifying section 45, and displays the guideline and the OSD around the periphery of the picture so that the user can easily recognize the picture adjustment result.

Embodiment 2

As shown in FIG. 7, the second embodiment of the apparatus for displaying a guide line for picture adjustment in a monitor according to the present invention comprises: an OSD generating section 72 for generating a predetermined OSD in accordances with the control signal outputted from the control section 71 of the monitor; an image signal generator 73 for generating image signals R, G, B to construct a picture; a control section 71 for outputting a command for generating an OSD to the OSD generating section 72 by recognizing a command for implementing a picture adjustment mode from the user, and detecting an active region of the image signals R, G, B outputted from the image signal generator 73 by means of an active region detector inside of the monitor so as to generate a guideline image at the corresponding position by means of a pattern generator inside of the monitor; an image amplifying section 74 for combining the OSD image signal outputted from the OSD generating section 72 and the image signals outputted from the image signal generator 73 with the guideline pattern signs outputted from the control section 71, and amplifies the combined signals; and a display section 75 for displaying an output from the image amplifying section 74 on the picture.

Here, a high-speed detection IC is employed for the active region detector mainly used for auto-sizing.

An operation of the apparatus for displaying guide line for picture adjustment according to the present invention constructed above will now be described herein below.

The user first inputs a picture adjustment menu key through a key input section of the monitor. The control section 71 subsequently recognizes the input.

The control section 71 then outputs a command for generating an OSD to the OSD generating section 72 so that the OSD for a picture adjustment mode can be displayed at the corresponding position. At the same time, the active region detector inside of the monitor 71, e.g., the high-speed detective IC, detects the beginning and ending positions of the active region of the image signals R, G, B supplied from the image signal generator 73. The pattern generator inside of the control section 71 outputs the signal for generating guideline patterns at the corresponding position to the image amplifying section 74.

At this stage, the high speed detective IC detects the image signals R, G, B and synchronous signals from the image signal generator 73, and transfers the information on the exact beginning and ending positions of the active region to the control section 71 upon request of an OSD by the user.

The OSD generating section 72 then outputs the image signal to construct the corresponding OSD to the image amplifying section 74 in accordance with the control signal from the control section 71. The image signal generator 73 outputs the image signals.

Subsequently, the image signal amplifying section 74 combines an output from the OSD generating section 72 and an output from the image signal generator 73 with the guideline pattern signals aud from the control section 71, and amplifies the combined signals so as to be outputted to the display section 75.

As shown in FIG. 6, the display section 75 displays the guideline and the OSD around the periphery of the picture so that the user can easily recognize the picture adjustment result.

Embodiment 3

As shown in FIG. 8, the third embodiment of the apparatus for displaying a guide line for picture adjustment in a monitor according to the present invention comprises: an OSD generating section 82 for generating an OSD and picture adjustment guideline image signals in accordance with the control signal outputted from the control section 81; an image signal generator 83 for generating image signals R, G, B to construct a picture; a control section 81 for outputting a command for generating the OSD and the guideline to the OSD generating section 82 by recognizing a command for implementing a picture adjustment mode from the user; an image amplifying section 84 for combining the OSD and the guideline image signal outputted from the OSD generating section 82 with the image signals outputted from the image signal generator 83; and a display section 85 for displaying an output of the image amplifying section 84 on the picture.

An operation of the apparatus for displaying a guide line for picture adjustment according to the present invention as constructed above will now be described herein below.

The user first inputs a picture adjustment menu key through a key input section of the monitor. The control section 81 subsequently recognizes the input.

The control section 81 then outputs a command for generating an OSD and a guideline to the OSD generating section 82 so that the OSD for a picture adjustment mode and the guideline can be displayed at the corresponding position.

The control section 81 can detect information on the beginning and ending positions of the active region in accordance with the horizontal and vertical synchronous signals transferred from a PC system. Thus, the control section 81 outputs the command for generating the OSD and the guideline to the OSD generating section 82 by means of the information on the corresponding position.

The OSD generating section 82 then outputs the image sia to display the corresponding OSD and the guideline to the image amplifying ion 84 in accordance with the control signal from the control section 81. The image signal generator 83 outputs the image signals.

The image signal amplifying section 84 combines the OSD and the guideline image signal outputted from the OSD generating section 82 with the image signals of the image signal generator 83, and amplifies the combined signals to a predetermined level so as to be outputted to the display section 85.

As shown in FIG. 6, the display section 85 undergoes a series of signal processing based on an output of the image amplifying section 84, and displays the guideline and the OSD around the periphery of the picture so that the user can easily recognize the picture adjustment result.

As described above, the Embodiment 1 and the Embodiment 3 provide a guideline for clearly lining the boundary of the picture in a picture adjusting mode, e.g., when adjusting the size of the picture. Thus, the adjusted result clearly appears on the picture.

The result of the picture adjustment may be highlighted by embodying the guideline with a color contrasted with the picture such as a red color.

The apparatus for displaying guide line for picture adjustment in a monitor according to the present invention embodies a guideline around the periphery of the picture in a picture adjustment mode for clearly lining the boundary of the picture. Therefore, the present invention carries effects of enhancing a user convenience as well as a reliability of the product.

The foregoing embodiments are merely exemplary and are not to be construed as limiting the present invention. The present teachings can be readily applied to other types of devices. The description of the present invention is intended to be illustrative, and not to limit the scope of the claims. Many alternatives, modifications, and variations will be apparent to those skilled in the art.

What is claimed is:

1. An apparatus for displaying a guide line for picture adjustment in a monitor; comprising:
    a control section for recognizing a command for executing a picture adjustment mode from a user, and outputting commands for generating an OSD and a guideline, respectively;
    a guideline information providing section for receiving the command for generating the guideline from the control section, and outputting information related to forming the guideline;
    an image signal generator for receiving information related to forming the guideline from the guideline information providing section, and outputting an image signal to construct a picture including the guideline corresponding to the information related to the guideline;
    an OSD generating section for receiving the command for generating the OSD from the control section, and outputting an OSD image signal to adjust a picture;
    an image amplifying section for combining the image signal including the guideline outputted from the image signal generator with the OSD image signal outputted from the OSD generating section; and
    a display section for displaying an output of the image amplifying section on a display screen.

2. The apparatus of claim 1, wherein the information related to the guideline includes at least one of the information on thickness and color of the guideline.

3. An apparatus for displaying a guide line for picture adjustment in a monitor, comprising
    an image signal generator for outputting an image signal to construct a picture;
    a control section for recognizing a command for executing a picture adjustment mode from a user, identifying a command for generating an OSD for picture adjustment, and beginning and ending positions of an active region of the image signal, and outputting a guideline pattern signal for generating a guideline;
    an OSD generating section for receiving the command for generating the OSD from the control section, and outputting an OSD image signal;
    an image amplifying section for combining the image signal outputted from the image signal generator, the guideline pattern signal outputted from the control section, and the OSD image signal outputted from the OSD generating section, and amplifying the combined signal; and
    a display section for displaying an output of the image amplifying section on a display screen.

4. The apparatus of claim 3, wherein the control section includes an active region detector for detecting beginning and ending positions of the active region from the image signal outputted from the image signal generator, and a guideline pattern generator for generating a guideline at the beginning and ending positions of the active region detected by the active region detector.

5. The apparatus of claim 4, wherein the active region detector is a high-speed detection IC used for auto-sizing.

6. An apparatus for displaying a guide line for picture adjustment in a monitor, comprising:
    an image signal generator for generating an image signal to construct a picture;
    a control section for recognizing a command for executing a picture adjustment mode from a user, and identifying a position of generating a guideline in accordance with inputted horizontal/vertical synchronous signals, and outputting a command for generating an OSD signal and the guideline signal for picture adjustment at the corresponding position;
    an OSD generating section for receiving the command for generating the OSD signal and the guideline signal from the control section, and outputting the OSD signal and the guideline signal;
    an image amplifying section for combining the OSD signal, the guideline signal outputted from the OSD generating section, and the image signal outputted from the image signal generator, and amplifying the combined signal; and
    a display section for displaying an output of the image amplifying section on a display screen.

7. The apparatus of claim 1, further comprising:
    an active region detector which detects beginning and ending positions of an active region including the OSD, wherein the image signal generator generates the guideline at the beginning and ending positions of the active region detected by the active region detector.

8. The apparatus of claim 7, wherein the active region detector is a high-speed detection IC used for auto-sizing.

9. The apparatus of claim 6, wherein the control section includes an active region detector which detects the position of generating the guideline, said position corresponding to beginning and ending positions of an active region of the OSD as detected by the active region detector based on the horizontal/vertical synchronous signals.

10. The apparatus of claim 9, wherein the active region detector is a high-speed detection IC used for auto-sizing.

11. An apparatus for a display device, comprising:
    an OSD generator to generate an on-screen display (OSD) on a display device; and
    a guideline generator to generate a guideline substantially surrounding the OSD on the display screen, wherein the OSD provides a statistical indication of a screen parameter adjustment and the guideline provide a visual indication of a result of the screen parameter adjustment.

12. The apparatus of claim 11, wherein said statistical indication includes at least one of a numerical value and a graph.

13. The apparatus of claim 11, wherein the guideline has a rectangular or square shape.

14. The apparatus of claim 11, wherein the guideline generator generates the guideline along a periphery of the screen.

15. An apparatus for a display device, comprising:
an OSD generator to generate an on-screen display (OSD) on a display device;
a guideline generator to generate a guideline substantially surrounding the OSD on the display screen; and
a controller which generates a first signal for input into the OSD generator to designate a location of the OSD on the screen, and generates a second signal for input into the guideline generator to command generation of the guideline.

16. The apparatus of claim 15, wherein the controller generates the first signal based on horizontal and vertical synchronous signals generated for the display device.

17. The apparatus of claim 15, wherein the guideline generator includes:
a guideline information providing section which generates information indicative of at least one a thickness and color of the guideline in response to the second signal generated by the controller; and
an image signal generator which generates an image signal for generating the guideline based on the information generated by the guideline information providing section.

18. An apparatus for a display device, comprising:
an OSD generator to generate an on-screen display (OSD) on a display device;
a guideline generator to generate a guideline substantially surrounding the OSD on the display screen;
a controller which inputs a signal designating a screen location of the OSD into the OSD generator; and
an active region detector which detects a position of an active region on the screen which includes the screen location of the OSD.

19. The apparatus of claim 18, wherein the active region detector is included within a high-speed detection integrated circuit (IC) which performs an auto-sizing function.

20. The apparatus of claim 18, wherein the controller includes the active region detector and the guideline generator, and wherein the guideline generator generates the guideline at a boundary of the active region position detected by the active region detector.

21. The apparatus of claim 18, wherein the active region detector detects the position of the active region based on horizontal and vertical synchronous signals generated for the display.

22. The apparatus of claim 21, wherein the active region detector detects beginning and ending positions of the active region based on the horizontal and vertical synchronous signals.

23. The apparatus of claim 22, wherein the guideline generator generates the guideline at the beginning and ending positions of the active region.

24. An apparatus for a display device, comprising:
an OSD generator to generate an on-screen display (OSD) on a display device;
a guideline generator to generate a guideline substantially surrounding the OSD on the display screen; and
a controller which generates a first signal for input into the OSD generator designating a screen location of the OSD and a second signal for input into the guideline generator designating a screen location of the guideline relative to the OSD screen location.

25. The apparatus of claim 24, wherein the controller generates the first and second signals based on horizontal and vertical synchronous signals generated for the display device.

26. A method, comprising:
generating an on-screen display (OSD); and
generating an indicator on the screen, wherein a screen parameter adjustment shown on the OSD is reflected as a corresponding change in the indicator, and wherein the indicator at least substantially surrounds the OSD on the screen.

27. The method of claim 26, wherein the OSD provides a statistical indication of the screen parameter adjustment, said statistical indication including at least one of a numerical value and a graph.

28. The method of claim 27, wherein the graph is a bar graph.

29. The method of claim 26, wherein the indicator is a guideline spaced a predetermined distance from the OSD on a screen.

30. The method of claim 26, wherein the indicator has a rectangular or square shape.

31. A method, comprising:
generating an on-screen display (OSD); and
generating an indicator on the screen, wherein a screen parameter adjustment shown on the OSD is reflected as a corresponding change in the indicator, and wherein the indicator is provided along a periphery of the screen.

32. A method, comprising:
generating an on-screen display (OSD);
generating an indicator on the screen, wherein a screen parameter adjustment shown on the OSD is reflected as a corresponding change in the indicator; and
detecting an active region on the screen which includes the OSD, wherein the indicator is provided at a boundary of the active region.

33. The method of claim 32, wherein the active region is detected based on horizontal and vertical synchronization signals for the display.

34. The method of claim 32, wherein the indicator is generated at beginning and ending positions of the active region.

35. The method of claim 32, wherein the detecting is provided in a high-speed detection integrated circuit (IC) which performs an auto-sizing function.

36. The method of claim 26, further comprising:
receiving a signal indicative of the screen parameter adjustment from a user operating a control menu of the display.

37. The method of claim 26, wherein indicator is generated to be distinguishable from other information on the screen.

38. The method of claim 37, wherein the indicator is displayed in a predetermined color.

39. The method of claim 26, wherein the screen parameter being adjusted is one of position, size, brightness, pin cushion, shape, and color.

40. A method, comprising:
receiving a signal for adjusting a screen parameter;
generating an on-screen display (OSD) to provide a statistical indication of the screen parameter adjustment in response to said signal; and
generating an indicator on the display to provide a visual indication of a result of the screen parameter adjustment, wherein the indicator at least substantially surrounds the OSD on the screen.

41. The method of claim 40, wherein the statistical indication provided by the OSD includes at least one of a numerical value and a graph.

42. The method of claim 41, wherein the graph is a bar graph.

43. The method of claim 40, wherein the indicator is a guideline spaced a predetermined distance from the OSD on the screen.

44. The method of claim 40, wherein the indicator has a rectangular or square shape.

45. A display processor, comprising:

means for receiving a signal for adjusting a screen parameter;

means for generating an on-screen display (OSD) to provide a statistical indication of the screen parameter adjustment in response to said signal;

means for generating an indicator on the display to provide a visual indication of a result of the screen parameter adjustment; and means for displaying the indicator along a periphery of the screen.

46. A method, comprising:

receiving a signal for adjusting a screen parameter;

generating an on-screen display (OSD) to provide a statistical indication of the screen parameter adjustment in response to said signal;

generating an indicator on the display to provide a visual indication of a result of the screen parameter adjustment; and detecting an active region on the screen which includes the OSD, wherein the indicator is provided at a boundary of the active region.

47. The method of claim 46, wherein the active region is detected based on horizontal and vertical synchronization signals for the display.

48. The method of claim 46, wherein the indicator is generated at beginning and ending positions of the active region.

49. The method of claim 46, wherein the detecting is provided in a high-speed detection integrated circuit (IC) which performs an auto-sizing function.

50. The method of claim 40, wherein the screen parameter adjustment signal is generated by a control menu function of the display activated by a user.

51. The method of claim 40, wherein the indicator is generated to be distinguishable from other information on the screen.

52. The method of claim 51, wherein the indicator is displayed in a predetermined color.

53. The method of claim 50, wherein said screen parameter adjustment signal designates a change in one of a picture position, size, brightness, pin cushion, shape, and color.

* * * * *